United States Patent

Ito

(10) Patent No.: US 9,500,839 B2
(45) Date of Patent: Nov. 22, 2016

(54) LENS BARREL AND IMAGE CAPTURING DEVICE

(71) Applicant: Panasonic Corporation, Osaka (JP)

(72) Inventor: Daisuke Ito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1 day.

(21) Appl. No.: 14/491,254

(22) Filed: Sep. 19, 2014

(65) Prior Publication Data

US 2015/0002949 A1 Jan. 1, 2015

Related U.S. Application Data

(63) Continuation of application No. PCT/JP2013/004193, filed on Jul. 5, 2013.

(30) Foreign Application Priority Data

Jul. 12, 2012 (JP) .................................. 2012-156240

(51) Int. Cl.
*G02B 7/02* (2006.01)
*G02B 7/10* (2006.01)
(Continued)

(52) U.S. Cl.
CPC . *G02B 7/10* (2013.01); *G02B 7/08* (2013.01); *G03B 17/12* (2013.01); *G03B 17/14* (2013.01); *G03B 17/565* (2013.01); *G03B 2205/0092* (2013.01)

(58) Field of Classification Search
CPC .......... G02B 7/08; G02B 7/10; G03B 17/12; G03B 17/565
USPC ......................................... 359/819–826, 694
See application file for complete search history.

(56) References Cited

U.S. PATENT DOCUMENTS 6,122,116 A * 9/2000 Uno ......................... G02B 7/10
359/823
6,501,909 B1 * 12/2002 Nishimura ............... G02B 7/10
396/74
(Continued)

FOREIGN PATENT DOCUMENTS

JP 5-100144 4/1993
JP 6-110112 4/1994
(Continued)

OTHER PUBLICATIONS

International Search Report issued Oct. 8, 2013 in International (PCT) Application No. PCT/JP2013/004193.

*Primary Examiner* — Scott J Sugarman
*Assistant Examiner* — Vipin Patel
(74) *Attorney, Agent, or Firm* — Wenderoth, Lind & Ponack, L.L.P.

(57) ABSTRACT

A lens barrel includes a fixed frame, a rotational frame, a first straight advance frame, a first lens retaining frame, and a first drive. The rotational frame engages with the fixed frame. The first straight advance frame engages with the rotational frame. The first lens retaining frame retains a first lens group and engage with the rotational frame. The first drive unit is attached to the first straight advance frame and drives rotationally the rotational frame around an optical axis. The first drive unit and the first straight advance frame move integrally with respect to the fixed frame in an optical axis direction according to a rotation of the rotational frame driven by the first drive unit. The first lens retaining frame further move with respect to the first straight advance frame in the optical axis direction, when the first straight advance frame moves such as above state.

20 Claims, 11 Drawing Sheets

(51) Int. Cl.
*G02B 7/08* (2006.01)
*G03B 17/12* (2006.01)
*G03B 17/56* (2006.01)
*G03B 17/14* (2006.01)

(56) References Cited

U.S. PATENT DOCUMENTS 6,768,596 B2 7/2004 Hattori et al.
2002/0126401 A1* 9/2002 Sasaki .................... G02B 7/08
                                                                    359/823
2002/0187001 A1 12/2002 Hattori et al.

FOREIGN PATENT DOCUMENTS

| JP | 8-211470 | 8/1996 |
| JP | 2003-66314 | 3/2003 |
| JP | 2006-215421 | 8/2006 |
| JP | 2010-117522 | 5/2010 |

* cited by examiner

LENS BARREL AND IMAGE CAPTURING DEVICE

CROSS-REFERENCE TO RELATED APPLICATIONS

This is a continuation application under 35 U.S.C. §120 and 35 U.S.C. §365 of International Application PCT/JP2013/004193, with an international filing date of Jul. 5, 2013 which claims priority to Japanese Patent Application No. 2012-156240 filed on Jul. 12, 2012. The entire disclosures of International Application PCT/JP2013/004193 and Japanese Patent Application No. 2012-156240 are hereby incorporated herein by reference.

BACKGROUND

Technical Field

The technology disclosed herein relates to collapsible lens barrels.

Background Information

In a lens barrel disclosed in Japanese Laid-Open Patent Application No. H5-100144A and Japanese Laid-Open Patent Application No. H8-211470A, a rotational frame in which a helicoid is formed rotates by a zoom motor. Furthermore, in this lens barrel, a lens frame is restricted from rotating by a fixed frame, and thus the lens frame moves in an optical axis direction along with the rotational frame. As a result, the focal length is adjusted, a desired primary subject is brought into focus, and so on.

The present disclosure provides a collapsible lens barrel that is capable of increasing the overall length of the barrel during use.

SUMMARY

The lens barrel disclosed herein includes a fixed frame, a rotational frame, a first straight advance frame, a first lens retaining frame, and a first drive. The rotational frame is configured to engage with the fixed frame. The first straight advance frame is configured to engage with the rotational frame. The first lens retaining frame is configured to retain a first lens group and engage with the rotational frame. The first lens group includes at least one lens. The first drive unit is attached to the first straight advance frame and configured to rotationally drive the rotational frame around an optical axis. The first drive unit and the first straight advance frame are configured to move integrally with respect to the fixed frame in an optical axis direction according to a rotation of the rotational frame driven by the first drive unit. The first lens retaining frame is configured to further move with respect to the first straight advance frame in the optical axis direction, when the first straight advance frame move with respect to the fixed frame according to the rotation.

The collapsible lens barrel according to the present disclosure is useful in increasing the overall length of the lens barrel during use.

BRIEF DESCRIPTION OF THE DRAWINGS

Referring now to the attached drawings, which form a part of this original disclosure.

DETAILED DESCRIPTION OF EMBODIMENTS

Embodiments of the present disclosure will be described in detail hereinafter with reference to the drawings where appropriate. There are cases where descriptions are omitted when further detail is not necessary. For example, detailed descriptions of well-known items, redundant descriptions of substantially identical configurations, and so on may be omitted. This is to avoid unnecessary redundancy in the descriptions and facilitate understanding for those of ordinary skill in the art.

Note that the inventors have provided the appended drawings and the following descriptions primarily so that those of ordinary skill in the art can sufficiently understand the present disclosure, and as such the content of the scope of patent claims is not intended to be limited by the drawings and descriptions in any way.

First Embodiment

Figure 1:
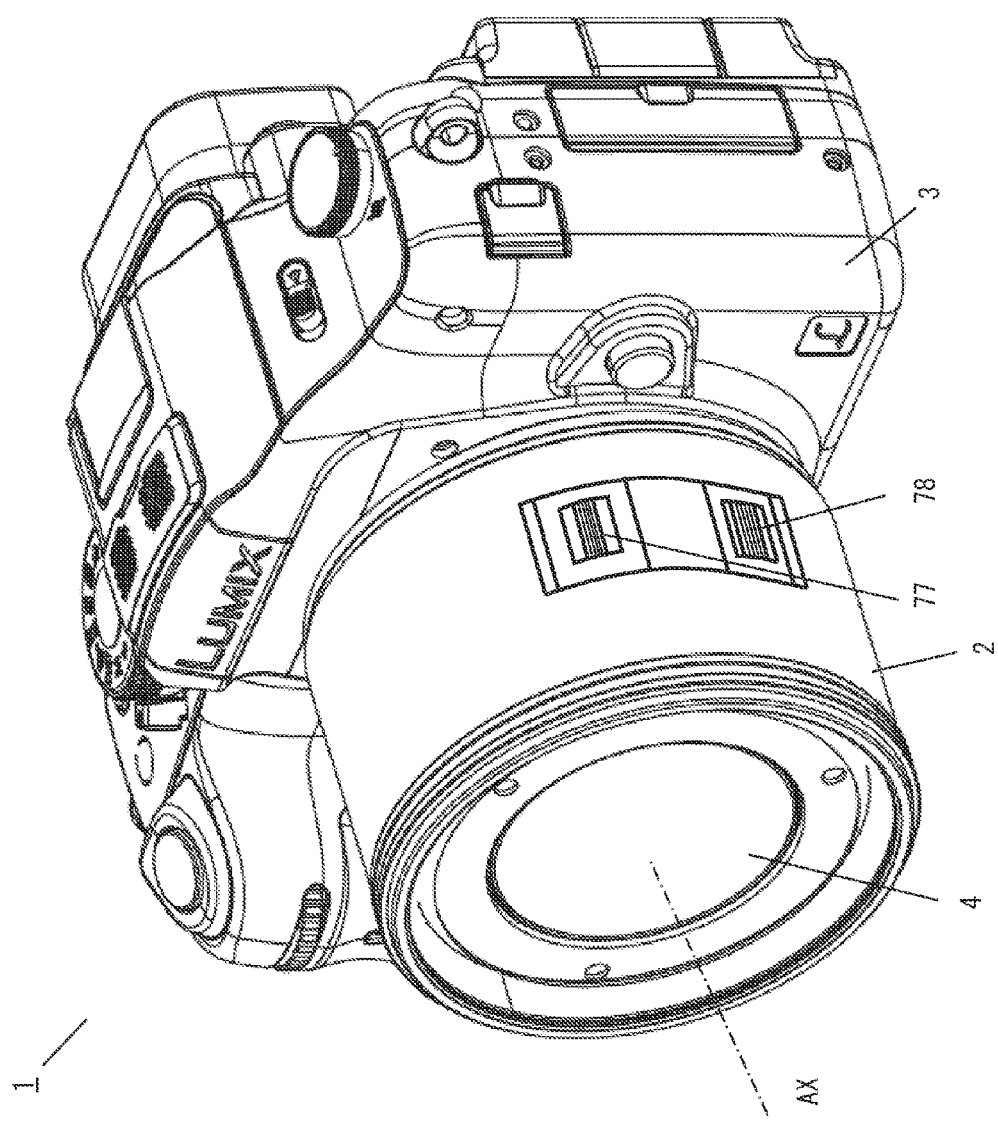
FIG. 1 is a perspective view illustrating an image capturing device according to a first embodiment.

FIG. 1 is a perspective view illustrating an image capturing device 1 according to a first embodiment. The image capturing device 1 is an interchangeable lens-type digital camera, and primarily includes a main camera body 3 and a lens barrel 2. The lens barrel 2 is attached to the main camera body 3 in a removable state. The lens barrel 2 retains lenses 4 (G1, G2, G3, and G4, described later). In FIG. 1, an optical axis AX is shown as an optical axis of the lenses 4. An optical axis AX direction corresponds to a direction that follows the optical axis AX, and is a direction parallel to the optical axis AX. The lens barrel 2 includes a zoom lever 77 and a focus lever 78. The focal length is adjusted by moving the lenses 4 in the optical axis AX direction when the zoom lever 77 accepts operations from a user. The focus is adjusted by move the lenses 4 in the optical axis AX direction when the focus lever 78 accepts operations from a user.

Figure 2:
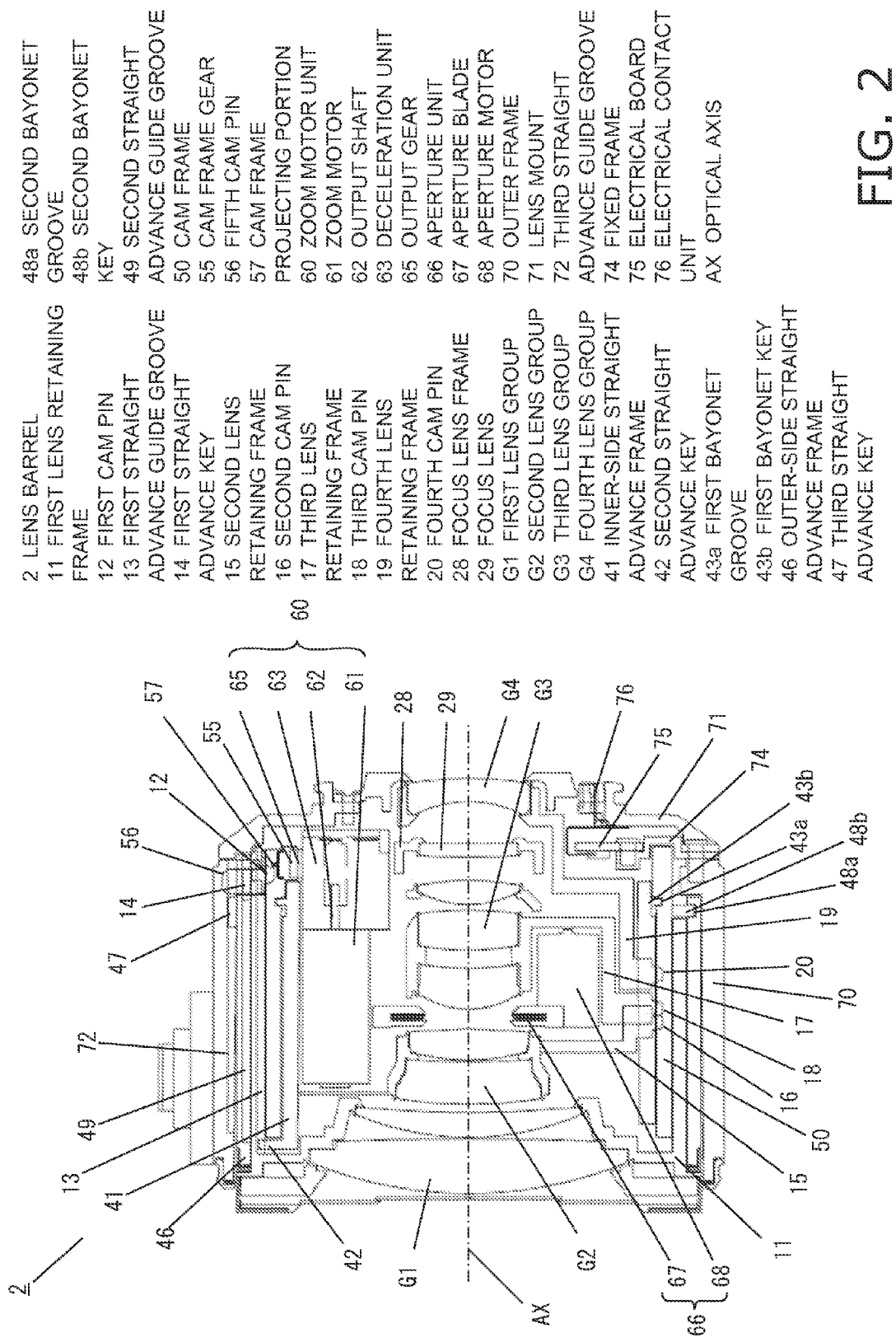
FIG. 2 is a cross-sectional view illustrating a lens barrel in a collapsed state, according to the first embodiment.

FIG. 2 is a cross-sectional view illustrating the lens barrel 2 in a collapsed state, according to the first embodiment. The lens barrel 2 includes an outer frame 70, a lens mount 71, a fixed frame 74, a cam frame 50 (an example of a rotational frame), an inner-side straight advance frame 41 (an example of a first straight advance frame), an outer-side straight advance frame 46 (an example of a second straight advance frame), a first lens group G1, a first lens retaining frame 11, a second lens retaining frame 15, a third lens retaining frame 17, a fourth lens retaining frame 19, and a zoom motor unit 60 (an example of a first drive unit). The outer frame 70 and the fixed frame 74 are an example of a fixed frame.

The lens mount 71 is a mount that enables a lens to be attached to the main camera body 3. The outer frame 70 is fixed to the lens mount 71, and is a member having an substantially overall barrel shape. The fixed frame 74 is fixed to the outer frame 70.

The cam frame 50 includes a second bayonet key 48b provided on an outer circumferential side, a first cam pin 56, a first bayonet groove 43a provided on an inner circumferential side, and a cam frame gear 55 (an example of a gear portion) provided closer to the lens mount 71 than the inner-side straight advance frame 41. The first cam pin 56 engages with the outer frame 70. The cam frame 50 is supported so as to be guided in the optical axis AX direction with respect to the outer frame 70 by rotating around the optical axis AX.

The inner-side straight advance frame 41 is provided on the inner circumferential side of the cam frame 50, and includes a second straight advance key 42 on an end portion on the far side of the cam frame gear 55 and a first bayonet key 43b on the inner circumferential side. The first bayonet groove 43a engages with the first bayonet key 43b. The inner-side straight advance frame 41 is restricted from moving with respect to the cam frame 50 in the optical axis AX direction. The inner-side straight advance frame 41 is supported so as to be move along with the cam frame 50 in the optical axis AX direction.

The outer-side straight advance frame 46 includes a third straight advance key 47 on an outer circumferential side, a second bayonet groove 48a on an inner circumferential side, and a second straight advance guide groove 49 extending in the optical axis AX direction on the inner circumferential side. The third straight advance key 47 engages with a third straight advance guide groove 72, and is supported so as to restrict the outer-side straight advance frame 46 from rotating around the optical axis AX and move the outer-side straight advance frame 46 in the optical axis AX direction. The second bayonet groove 48a engages with the second bayonet key 48b. The outer-side straight advance frame 46 is restricted from moving with respect to the cam frame 50 in the optical axis AX direction. The outer-side straight advance frame 46 is supported so as to move along with the cam frame 50 in the optical axis AX direction.

The first lens retaining frame 11 retains the first lens group G1. The first lens retaining frame 11 is retained by the outer-side straight advance frame 46. The first lens retaining frame 11 is disposed between the outer-side straight advance frame 46 and the inner-side straight advance frame 41 in a direction orthogonal to the optical axis AX (a radial direction).

The first lens retaining frame 11 includes a second cam pin 12 (an example of a first cam pin) provided on an inner circumferential side, a first straight advance guide groove 13 provided on the inner circumferential side, and a first straight advance key 14 provided on an outer circumferential side. The first straight advance key 14 engages with the second straight advance guide groove 49 and restricts the first lens retaining frame 11 from rotating around the optical axis AX. The first lens retaining frame 11 moves in the optical axis AX direction by the engagement of the first straight advance key 14 and the second straight advance guide groove 49.

The second lens retaining frame 15 retains a second lens group G2. The second lens retaining frame 15 includes a third cam pin 16 (an example of a second cam pin) on an outer circumferential side. The third cam pin 16 engages with the inner-side straight advance frame 41 in a circumferential direction, and engages with the cam frame 50 on an outer side of the inner-side straight advance frame 41. As a result, the second lens retaining frame 15 is restricted from rotating around the optical axis AX and is supported so as to move in the optical axis AX direction by the rotation of the cam frame 50.

The third lens retaining frame 17 retains a third lens group G3. The third lens retaining frame 17 includes a fourth cam pin 18 (an example of a third cam pin) on an outer circumferential side. The fourth cam pin 18 engages with the inner-side straight advance frame 41 in the circumferential direction, and engages with the cam frame 50 on the outer side of the inner-side straight advance frame 41. As a result, the third lens retaining frame 17 is restricted from rotating around the optical axis AX and is supported so as to move in the optical axis AX direction by the rotation of the cam frame 50.

The fourth lens retaining frame 19 retains a fourth lens group G4. The fourth lens retaining frame 19 includes a fifth cam pin 20 (an example of a fourth cam pin) on an outer circumferential side. The fifth cam pin 20 engages with the inner-side straight advance frame 41 in the circumferential direction, and engages with the cam frame 50 on the outer side of the inner-side straight advance frame 41. As a result, the fourth lens retaining frame 19 is restricted from rotating around the optical axis AX and is supported so as to move in the optical axis AX direction by the rotation of the cam frame 50.

The zoom motor unit 60 includes a zoom motor 61 (an example of an actuator), an output shaft 62, a deceleration unit 63, and an output gear 65. Note that the output shaft 62, the deceleration unit 63 that includes a gear train 64 (described later), and the output gear 65 are an example of a transmission mechanism.

The cross-section of the zoom motor 61 is formed in a substantially oval shape. More specifically, the cross-section of the zoom motor 61 has a shape obtained by cutting a circle using two parallel straight lines. In other words, a cross-sectional portion of the zoom motor 61 is formed from straight line portions that are opposite from each other (H cut portions, described later) and curved line portions that are opposite from each other.

The deceleration unit 63 includes the gear train 64. Power of the zoom motor 61 is transmitted to the output gear 65 via the gear train 64 (the deceleration unit 63) connected to the output shaft 62. The output gear 65 engages with the cam frame gear 55 on the side of the lens mount 71 based on the inner-side straight advance frame 41. The zoom motor unit 60 is attached on the inner circumferential side of the inner-side straight advance frame 41. As a result, when the output shaft 62 of the zoom motor 61 is rotationally driven, the cam frame 50 is rotationally driven around the optical axis AX by the gear train 64, the output gear 65, and the cam frame gear 55.

A focus lens frame 28 (an example of a fourth lens retaining frame) retains a focus lens 29. The focus lens frame 28 is supported so as to move with respect to the third lens retaining frame 17 in the optical axis direction, and is driven in the optical axis AX direction by a focus motor unit 35 (an example of a second drive unit).

An aperture unit 66 is attached to the third lens retaining frame 17. The aperture unit 66 includes a plurality of aperture blades 67 and an aperture motor 68 that drives the aperture blades 67. The aperture blades 67 are driven by drive force generated by the aperture motor 68. The aperture blades 67 are configured to adjust an amount of light, which passes through the lens groups, by advancing/retracting along the optical path.

An electrical board 75 is attached to the fixed frame 74 and is electrically connected to an electrical contact unit 76. In the present first embodiment, the electrical board 75 is disposed on the inner circumferential side of the cam frame 50 when viewed from the optical axis AX direction. As a result, the cam frame 50 can be brought closer to the lens mount 71, which makes it possible to reduce the size of the lens barrel 2.

Note that the present first embodiment describes, as an example, a case where an optical system including four lens groups and a focus lens group is realized. However, the present technology is not limited thereto.

Figure 3:
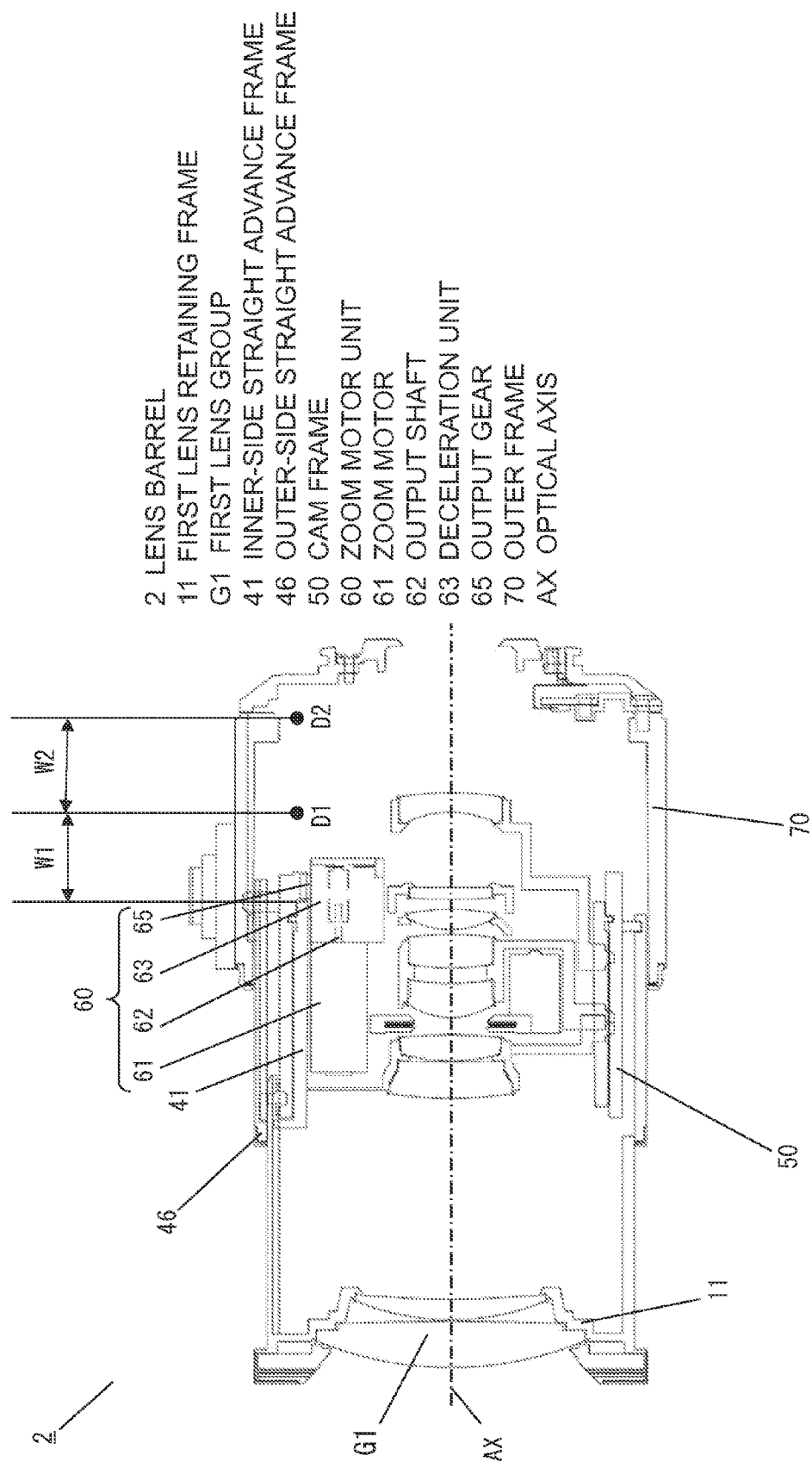
FIG. 3 is a cross-sectional view illustrating a lens barrel in a telephoto end shooting state, according to the first embodiment.

FIG. 3 is a cross-sectional view illustrating the lens barrel 2 in a telephoto end shooting state, according to the first embodiment. The zoom motor unit 60 rotationally drives the cam frame 50. As a result, the cam frame 50, the inner-side straight advance frame 41, and the first lens retaining frame 11 move in the optical axis direction. When the first lens retaining frame 11 is at the telephoto end, where the frame is closest to the subject side, the lens barrel 2 does not overlap with the outer frame 70 as viewed from the direction orthogonal to the optical axis.

Figure 4:
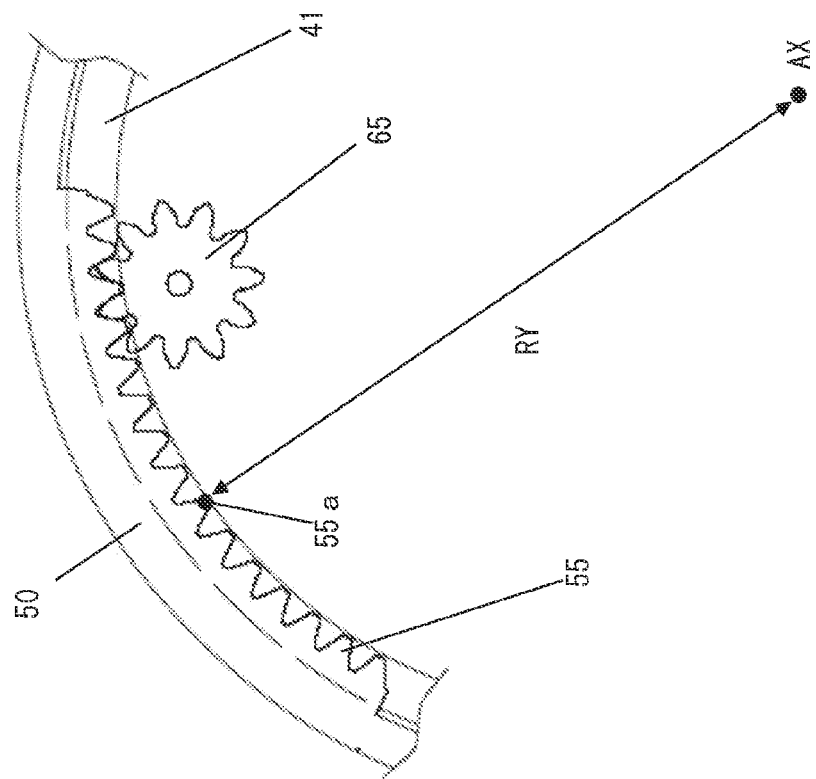
FIG. 4 is a diagram illustrating a cam frame gear and an output gear engaging with each other, according to the first embodiment.

FIG. 4 is a diagram illustrating the cam frame gear 55 and the output gear 65 engaging with each other, according to the first embodiment. The cam frame gear 55 is disposed so that a ridge diameter RY (in other words, an innermost diameter of the cam frame gear 55) is equal to the inner diameter of the inner-side straight advance frame 41 or is greater than the inner diameter of the inner-side straight advance frame 41. In other words, the cam frame gear 55 is disposed so as not to protrude further toward the inner circumferential side than the inner-side straight advance frame 41. Note that the ridge diameter RY is the length of a line segment connecting the optical axis AX to a crest portion 55a (an apex portion) of the gear portion in the radial direction.

Figure 5:
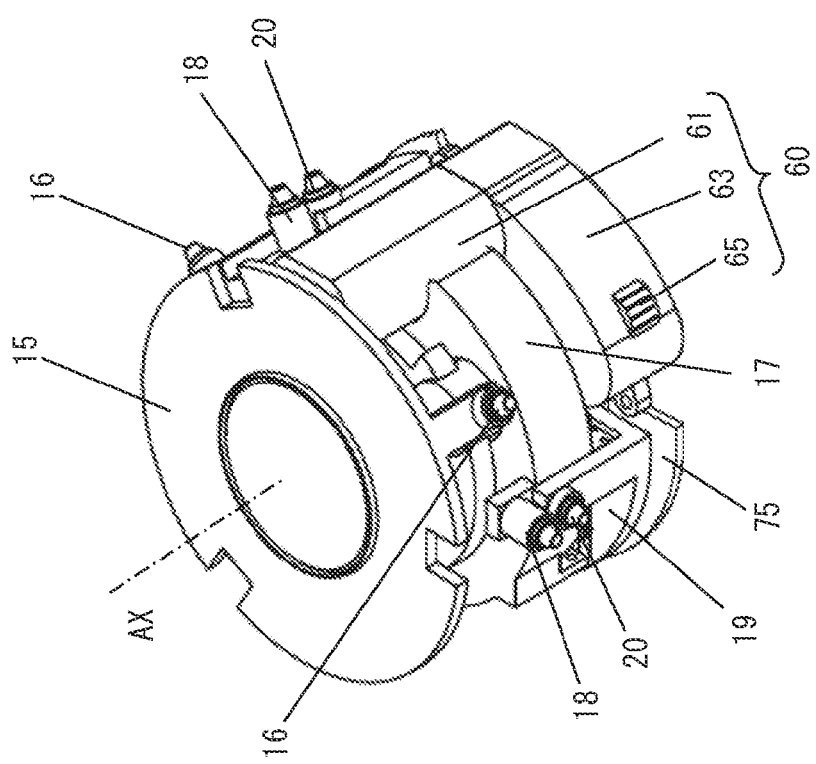
FIG. 5 is an internal perspective view illustrating the lens barrel according to the first embodiment.

FIG. 5 is a perspective view illustrating the second lens retaining frame 15, the third lens retaining frame 17, the fourth lens retaining frame 19, the zoom motor unit 60, and the electrical board 75. The zoom motor 61 is disposed between the third cam pin 16 and the fourth cam pin 18 in the circumferential direction. In the zoom motor 61, the output shaft 62 (rotational shaft) is disposed so as to be substantially parallel to the optical axis AX. The deceleration unit 63 is disposed along the circumferential direction. In the deceleration unit 63, the output gear 65 protrudes outward in the radial direction. When viewed from the optical axis AX direction, the deceleration unit 63 and the third cam pin 16 overlap. The electrical board 75 is formed in a circular board shape including a hole in the center thereof. A region of the electrical board 75, where the deceleration unit 63 is provided, is cut out. As a result, when viewed in the direction orthogonal to the optical axis AX direction, the deceleration unit 63 and the electrical board 75 are prevented from interfering with each other even when the deceleration unit 63 moves to a position where the deceleration unit 63 overlaps with the electrical board 75. Also, the zoom motor unit 60 can be brought closer to the lens mount 71 when collapsed, which makes it possible to reduce the size of the lens barrel 2.

Figure 6:
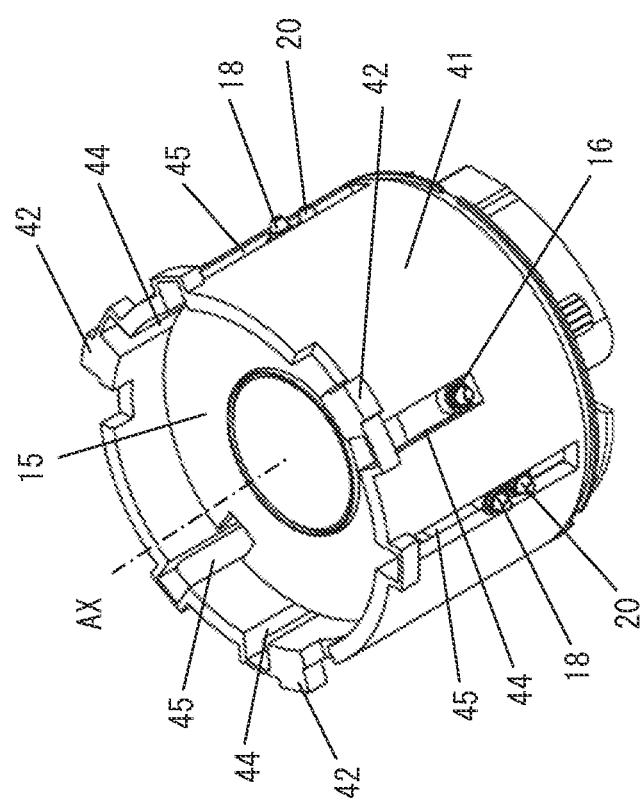
FIG. 6 is an internal perspective view illustrating the lens barrel according to the first embodiment.

FIG. 6 is a perspective view illustrating a state in which the second lens retaining frame 15, the third lens retaining frame 17, the fourth lens retaining frame 19, the zoom motor unit 60, and the electrical board 75 have been inserted into the inner-side straight advance frame 41. The second lens retaining frame 15, the third lens retaining frame 17, and the fourth lens retaining frame 19 are inserted into the inner-side straight advance frame 41 from the subject side. At this time, the third cam pin 16 engages with a first slot 44, and the fourth cam pin 18 and the fifth cam pin 20, which are provided in the same phase in the circumferential direction, engage with a second slot 45. The widths of the third cam pin 16 and the first slot 44 in the circumferential direction (that is, the widths in the direction orthogonal to the optical axis AX direction) are substantially same. Likewise, the widths of the fourth cam pin 18, the fifth cam pin 20, and the second slot 45 in the circumferential direction (that is, the widths in the direction orthogonal to the optical axis AX direction) are substantially the same. As a result, the second lens retaining frame 15, the third lens retaining frame 17, and the fourth lens retaining frame 19 are restricted from rotating around the optical axis, and move in the optical axis AX direction. The third cam pin 16, the fourth cam pin 18, the fifth cam pin 20, the first slot 44, and the second slot 45 are each provided in three locations.

The second straight advance key 42 is provided in three locations of the inner-side straight advance frame 41 on the end portion thereof on the farther side from the cam frame gear 55. Each second straight advance key 42 engages with a corresponding first straight advance guide groove 13, provided in three locations on the inner circumferential side of the first lens retaining frame 11. As a result, the inner-side straight advance frame 41 is restricted from rotating around the optical axis AX. Although detailed descriptions will be omitted, it should be noted that the other straight advance keys engage with the other straight advance guide grooves and restrict rotation in the same manner.

Figure 7:
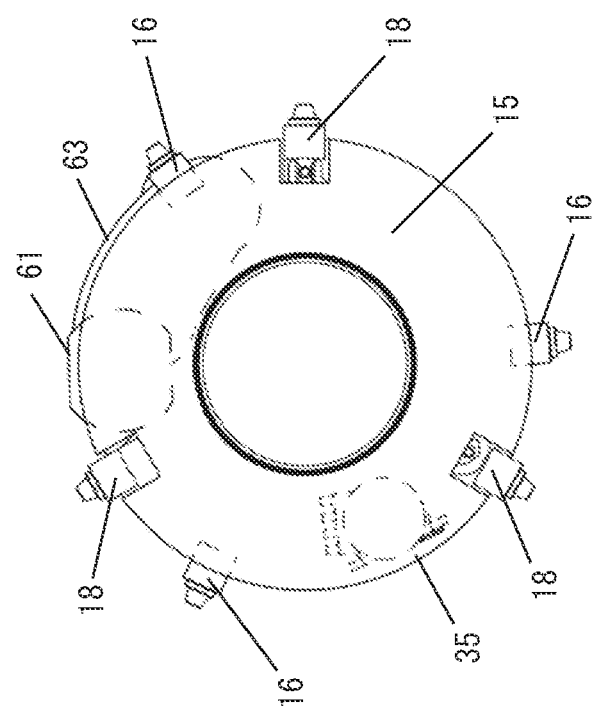
FIG. 7 is an internal front view illustrating the lens barrel according to the first embodiment.

FIG. 7 is an internal front view of the lens barrel 2 as seen from the optical axis AX direction. When viewed from the optical axis AX direction, the third cam pin 16 overlaps with the deceleration unit 63. At least one of the third cam pin 16 and the fourth cam pin 18 is disposed between the zoom motor 61 and the focus motor unit 35 in the circumferential direction. Specifically, at least one of the third cam pin 16 and the fourth cam pin 18 is disposed in an area where a distance between the zoom motor 61 and the focus motor unit 35 in the circumferential direction is short.

Figure 8:
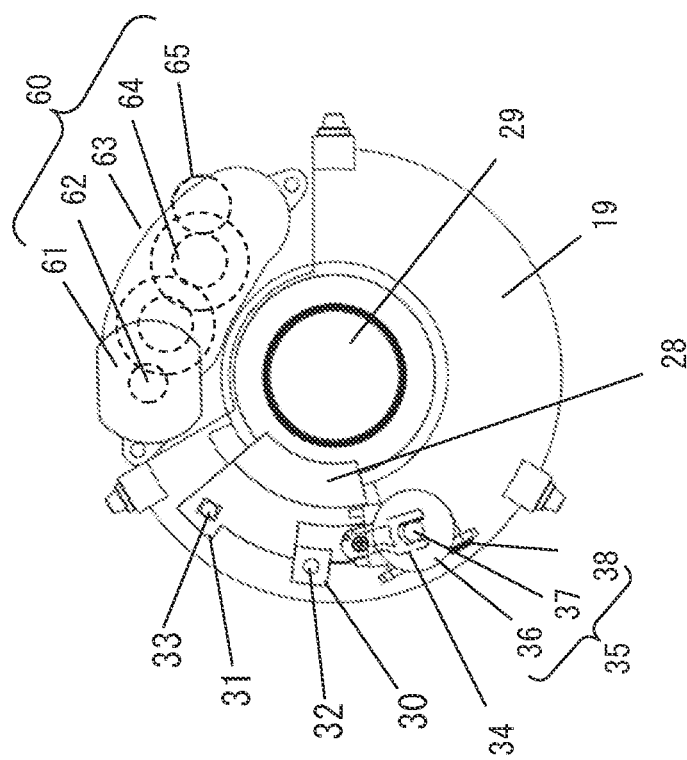
FIG. 8 is an internal front view illustrating the lens barrel according to the first embodiment.

FIG. 8 is an internal front view of the lens barrel 2 as seen from the optical axis AX direction. The focus lens frame 28 retains the focus lens 29. The focus lens frame 28 includes a guide portion 30 and a rotation restriction portion 31. The focus lens frame 28 engages with a focus guide shaft 32 provided in the third lens retaining frame 17 and a focus rotation restriction shaft 33. The focus lens frame 28 is supported by the focus guide shaft 32 to move in the optical axis AX direction, and is restricted from rotating around the focus guide shaft 32 by the focus rotation restriction shaft 33. The focus motor unit 35 includes a focus motor 36, a threaded screw 37, and a metal plate 38. The focus motor unit 35 is attached to the third lens retaining frame 17. When the screw 37 is rotationally driven by the focus motor 36, a rack 34 that engages with the screw 37 is driven in the optical axis AX direction. As a result, the focus lens frame 28 is driven in the optical axis AX direction integrally with the rack 34.

Figure 9:
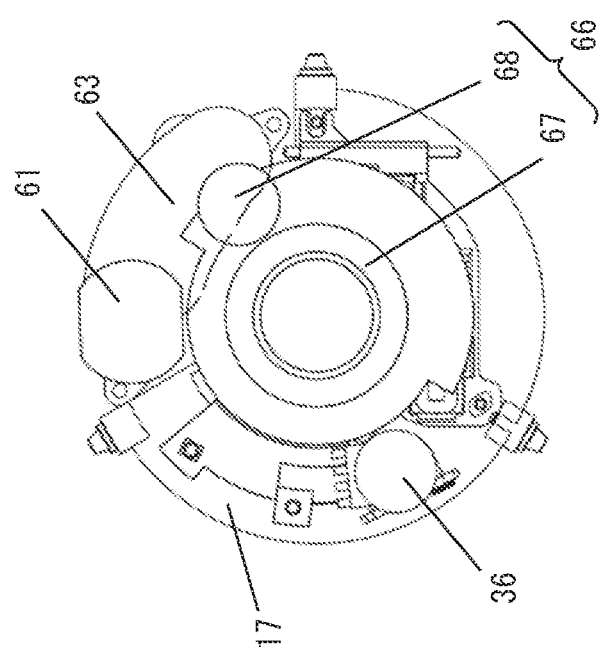
FIG. 9 is an internal front view illustrating the lens barrel according to the first embodiment.

FIG. 9 is an internal front view of the lens barrel 2 as seen from the optical axis AX direction. The zoom motor 61 has a shape on which, for example, a cylinder is subjected to H cutting. The H cut portions of the zoom motor 61 are provided following the normal direction of the lens barrel 2. Also, the zoom motor 61 is provided on an outer side of the aperture unit 66 in the radial direction thereof. When viewed from the optical axis AX direction, the deceleration unit 63 and the aperture unit 66 partially overlap. The focus motor 36 is disposed so that the rotational shaft thereof is substantially parallel to the optical axis AX. The focus motor 36 is disposed between the third cam pin 16 and the fourth cam pin 18 in the circumferential direction. Specifically, the focus motor 36 is disposed in an area where a distance between the third cam pin 16 and the fourth cam pin 18 in the circumferential direction is short. Furthermore, the third cam pin 16 and the fourth cam pin 18 are disposed in an area where a distance between the zoom motor 61 and the focus motor unit 35 in the circumferential direction is short. Meanwhile, when viewed from the optical axis AX direction, the deceleration unit 63 and the third cam pin 16 partially overlap.

In the present embodiment, the lens barrel 2 includes the fixed frame 74, the cam frame 50, the inner-side straight advance frame 41, the first lens group G1, the first lens retaining frame 11, and the zoom motor unit 60. The cam frame 50 is supported by the fixed frame 74 so as to rotate around the optical axis and move parallel to the optical axis direction. The inner-side straight advance frame 41 moves in the optical axis direction, while maintaining a predetermined distance from the cam frame 50 in the optical axis direction. In other words, the inner-side straight advance frame 41 moves in the optical axis direction along with the cam frame 50. The first lens group G1 includes a lens that receives subject light. The first lens group G1 includes at least one lens. The first lens retaining frame 11 retains the first lens group, engages with the cam frame 50, and is supported by the outer-side straight advance frame 46 so as to move in the optical axis direction. The zoom motor unit 60 is attached to the inner-side straight advance frame 41 and rotationally drives the cam frame 50. The cam frame 50, the inner-side straight advance frame 41, and the first lens retaining frame 11 are movable with respect to the fixed frame 74 in the optical axis direction. When viewed from the direction orthogonal to the optical axis, the first lens retaining frame 11 does not overlap with the fixed frame 74 when the first lens retaining frame 11 is closest to the subject.

As a result, the zoom motor 61 can continuously transmit rotational drive force to the cam frame 50, even if the cam frame 50 moves in the optical axis AX direction. The amount of movement of the first lens retaining frame 11 in the optical axis AX direction is the sum of the amount of movement of the cam frame 50 with respect to the fixed frame 74 and the amount of movement of the first lens retaining frame 11 with respect to the cam frame 50. As such, the amount of movement of the first lens group G1 in the optical axis AX direction can be increased even if the collapsed length is reduced. This makes it possible to increase the overall length of the lens barrel during use.

Also, in the lens barrel 2 according to the present embodiment, the zoom motor unit 60 is provided on the inner circumferential side of the inner-side straight advance frame 41.

As a result, an unnecessary protruding portion can be eliminated, as compared to a case where the zoom motor unit 60 is attached to an outer side of the lens barrel 2. This makes it possible to reduce the size of the lens barrel 2, and ensures an substantially circular outer profile, which in turn makes it possible to realize a slimmer design.

Furthermore, in the lens barrel 2 according to the present embodiment, the cam frame 50 includes the cam frame gear 55. The zoom motor unit 60 includes the zoom motor 61, the output shaft 62, the deceleration unit 63, the gear train 64, and the output gear 65. The output gear 65 engages with the cam frame gear 55 and transmits the output of the zoom motor 61 to the cam frame 50.

As a result, the cam frame 50 can be rotationally driven by the zoom motor 61 from the inner circumferential side, and the output of the zoom motor 61 can be amplified by the deceleration unit 63. This makes it possible to reduce the size of the zoom motor 61 and the lens barrel 2, and ensures an substantially circular outer profile, which in turn makes it possible to realize a slimmer design.

Also, in the lens barrel 2 according to the present embodiment, the ridge diameter RY of the cam frame gear 55 is equal to the inner diameter of the inner-side straight advance frame 41 or greater than the inner diameter of the inner-side straight advance frame 41.

As a result, the moving path of the cam frame gear 55 does not protrude to the inner circumferential side of the inner-side straight advance frame 41 even when the cam frame gear 55 moves in the circumferential direction or in the optical axis AX direction. Accordingly, components can be efficiently disposed on the inner circumferential side of the inner-side straight advance frame 41, which enables the lens barrel 2 to be miniaturized.

Furthermore, in the lens barrel 2 according to the present embodiment, the longitudinal direction of the zoom motor unit 60 is substantially parallel to the optical axis AX. Note that the longitudinal direction of the zoom motor unit 60 corresponds to the direction in which the output shaft 62 extends.

As a result, the diameter of a circle which circumscribes the zoom motor unit 60 around the optical axis AX can be made smaller than in the case where the longitudinal direction of the zoom motor unit 60 is tilted or orthogonal to the optical axis AX. This makes it possible to reduce the diameter of the lens barrel 2.

Also, in the lens barrel 2 according to the present embodiment, the direction of the shortest dimension of the zoom motor unit 60 is provided along the normal direction of the inner-side straight advance frame 41. In other words, the direction of the shortest dimension of the zoom motor unit 60 follows the radial direction that is orthogonal to the optical axis AX. Note that the direction of the shortest dimension of the zoom motor unit 60 is a direction in which a straight line extends. The straight line is substantially orthogonal to the opposing straight line portions in the cross-section of the zoom motor unit 60. More specifically, in the case where, in the cross-section of the zoom motor 61, the direction orthogonal to the straight line portion is defined as a minor axis direction, the direction orthogonal to the minor axis direction is defined as a major axis direction, the direction of the shortest dimension of the zoom motor unit 60 corresponds to the minor axis direction.

As a result, the diameter of a circle that circumscribes the zoom motor unit 60 around the optical axis AX can be made as small as possible. This makes it possible to reduce the diameter of the lens barrel 2.

Furthermore, in the lens barrel 2 according to the present embodiment, an end portion of the cam frame 50 in the optical axis direction includes a cam frame projecting portion 57 (an example of a protruding portion). The cam frame projecting portion 57 projects beyond the end portion of the inner-side straight advance frame 41 in the optical axis direction on the basis of the inner-side straight advance frame 41. Specifically, the cam frame projecting portion 57 projects in the optical axis direction beyond the end portion of the inner-side straight advance frame 41 that is located on the same side as the end portion of the cam frame 50 in the optical axis direction. The cam frame gear 55 is provided on the cam frame projecting portion 57.

As a result, the output of the zoom motor unit 60 located on the inner circumferential side of the inner-side straight advance frame 41 can be transmitted to the cam frame 50 located on the outer circumferential side of the inner-side straight advance frame 41 without the need to make a cutout in the inner-side straight advance frame 41. Accordingly, a flexibility in the layout of the first bayonet groove 43a and the first bayonet key 43b can be increased and the mechanism for transmitting the output of the zoom motor unit 60 to the cam frame 50 can be reduced in size, which in turn makes it possible to reduce the size of the lens barrel 2.

The lens barrel 2 according to the present embodiment further includes the outer-side straight advance frame 46. The outer-side straight advance frame 46 engages with the outer frame 70 and is restricted from rotating by the outer frame 70. The outer-side straight advance frame 46 engages with the cam frame 50 and is supported so as to move in the optical axis direction, while maintaining a predetermined distance from the cam frame 50 in the optical axis direction. The first lens retaining frame 11 engages with the outer-side straight advance frame 46 and is restricted from rotating by the outer-side straight advance frame 46. The inner-side straight advance frame 41 engages with any one of the first lens retaining frame 11, the outer frame 70, and the outer-side straight advance frame 46, and is restricted from rotating by any one of the frames.

As a result, the outer-side straight advance frame 46 and the inner-side straight advance frame 41 can be restricted from rotating, and the first lens retaining frame 11, the second lens retaining frame 15, the third lens retaining frame 17, and the fourth lens retaining frame 19 can be restricted from rotating. This makes it possible to extend each lens group further toward the subject side with respect to the outer frame 70, which in turn makes it possible to increase the overall length of the lens barrel 2 during use.

Furthermore, in the lens barrel 2 according to the present embodiment, the cam frame projecting portion 57 is provided at the end of the cam frame 50 which locates on the side of the lens mount 71.

As a result, the cam frame gear 55 and the zoom motor unit 60 can be disposed on the farther side from the subject. Accordingly, the zoom motor unit 60 can be disposed in a location which an user don't see when the lens barrel 2 is viewed from the subject side, which in turn makes it possible to realize a lens barrel 2 having a favorable external appearance.

Furthermore, in the lens barrel 2 according to the present embodiment, the inner-side straight advance frame 41 is provided on the inner circumferential side of the cam frame 50. Meanwhile, the inner-side straight advance frame 41 engages with the first lens retaining frame 11 at the end portion of the cam frame 50 which locates on the farther side from the cam frame gear 55, and is restricted from rotating by the first lens retaining frame 11. Here, the end portion of the cam frame 50 which locates on s further from the cam frame gear 55 corresponds to the end portion of the cam frame 50 on the opposite side from the cam frame gear 55, or in other words, the end portion on the subject side.

As a result, the inner-side straight advance frame 41 and the first lens retaining frame 11 can engage with each other without preventing the zoom motor unit 60 and the cam frame gear 55 from engaging with each other. Accordingly, the rotation restriction configuration of the inner-side straight advance frame 41 can be simplified, and the inner-side straight advance frame 41 can be restricted from rotating even when the first lens retaining frame 11 moves beyond the outer frame 70 toward the subject side in the optical axis AX direction. Thus, the lens groups can be extended further toward the subject side with respect to the outer frame 70, which makes it possible to increase the overall length of the lens barrel 2 during use.

Furthermore, in the lens barrel 2 according to the present embodiment, the first lens retaining frame 11 is provided on the outer circumferential side of the cam frame 50. One of at least one second cam pin 12 and at least one first cam groove 51 is provided on the inner circumferential side of the first lens retaining frame 11. The other of the at least one second cam pin 12 and at least one first cam groove 51 is provided on the outer circumferential side of the cam frame 50. The second cam pin 12 and the first cam groove 51 engage with each other. The outer-side straight advance frame 46 is provided on the outer circumferential side of the first lens retaining frame 11.

As a result, a cam mechanism that drives the first lens retaining frame 11 in the optical axis AX direction can be disposed on the inner circumferential side of the first lens retaining frame 11 or the inner circumferential side of the outer-side straight advance frame 46. Accordingly, the cam mechanism cannot be seen from the outside of the lens barrel 2, which makes it possible to realize a lens barrel 2 having a favorable external appearance without providing new external components.

The lens barrel 2 according to the present embodiment further includes the second lens retaining frame 15 disposed on the inner circumferential side of the inner-side straight advance frame 41. The second lens retaining frame 15 includes the third cam pin 16 that passes through the inner-side straight advance frame 41 from the inner circumferential side to the outer circumferential side thereof and engages with the cam frame 50. The cam frame 50 includes a second cam groove 52 that engages with the third cam pin 16, on the inner circumferential side thereof. The second lens retaining frame 15 is restricted from rotating by engaging with the inner-side straight advance frame 41, and is driven in the optical axis direction by the rotation of the cam frame 50.

As a result, the plurality of lens groups can be driven in the optical axis AX direction, and the cam mechanism, a rotation restriction mechanism, and so on can be disposed in locations that cannot be seen from the exterior of the lens barrel 2. Accordingly, the flexibility of the optical design and the mechanical design can be increased, and a smaller lens barrel 2 can be realized.

Furthermore, in the lens barrel 2 according to the present embodiment, the second lens retaining frame 15 retains the second lens group G2, which includes at least one lens. The second lens group G2 is provided closer to the lens mount 71 than the first lens group G1.

As a result, the cam mechanism, the rotation restriction mechanism, and so on can be disposed in locations that cannot be seen from the exterior of the lens barrel 2. Accordingly, it is possible to realize a lens barrel 2 having a favorable external appearance without providing new external components.

The lens barrel 2 according to the present embodiment further includes the third lens retaining frame 17 disposed on the inner circumferential side of the inner-side straight advance frame 41. The third lens retaining frame 17 includes the fourth cam pin 18 that passes through the inner-side straight advance frame 41 from the inner circumferential side to the outer circumferential side thereof and engages with the cam frame 50. The cam frame 50 includes a third cam groove 53 that engages with the fourth cam pin 18, on the inner circumferential side thereof. The third lens retaining frame 17 is restricted from rotating by engaging with the inner-side straight advance frame 41, and is driven in the optical axis direction by the rotation of the cam frame 50. The zoom motor 61 is disposed between the third cam pin 16 and the fourth cam pin 18 when viewed from the optical axis direction.

As a result, the plurality of lens groups can be driven in the optical axis AX direction, and the flexibility of the optical design can be increased. The zoom motor 61 can be made longer in the optical axis AX direction, and the third cam pin 16 and the fourth cam pin 18 can be disposed with more flexibility in the optical axis AX direction. Accordingly, a larger zoom motor 61 can be disposed, which makes it possible to realize high-speed driving. Also, the collapsed length of the lens barrel 2 can reduce, which makes it possible to reduce the size of the lens barrel 2.

Furthermore, in the lens barrel 2 according to the present embodiment, at least one of the third cam pin 16 and the fourth cam pin 18 overlaps with the deceleration unit 63 when viewed from the optical axis direction.

As a result, the deceleration unit 63 can be lengthened in the circumferential direction. Accordingly, a greater deceleration ratio can be realized by the deceleration unit 63, which in turn makes it possible to increase the torque of the zoom motor 61.

The lens barrel 2 according to the present embodiment further includes the focus lens frame 28 and the focus motor unit 35. The focus lens frame 28 is supported so as to move with respect to the second lens retaining frame 15 in the optical axis direction. The focus motor unit 35 drives the focus lens frame 28 in the optical axis direction. The focus motor unit 35 is disposed between the third cam pin 16 and the fourth cam pin 18 when viewed from the optical axis direction.

As a result, the focus lens frame 28 can be driven in the optical axis AX direction, and the flexibility of the optical design can be increased. Also, the focus motor unit 35 can be made longer in the optical axis AX direction. Further, third cam pin 16 and the fourth cam pin 18 can be disposed with more flexibilty in the optical axis AX direction. Accordingly, the collapsed length of the lens barrel 2 can be reduced, and a smaller size can be realized in the lens barrel 2, while also increasing the distance in which the focus lens frame 28 moves in the optical axis AX direction.

Furthermore, in the lens barrel 2 according to the present embodiment, at least one of the third cam pin 16 and the fourth cam pin 18 is disposed between the zoom motor unit 60 and the focus motor unit 35.

As a result, the third cam pin 16 and the fourth cam pin 18 can be disposed at substantially equal intervals in the circumferential direction. Accordingly, the orientations of the second lens group G2, the third lens group G3, and so on can be made more stable.

The lens barrel 2 according to the present embodiment further includes the electrical board 75. The electrical board 75 is attached to the outer frame 70 and supplies electrical power to the zoom motor unit 60.

When the inner-side straight advance frame 41 has moved at a position which is closest to the lens mount 71, the zoom motor unit 60 and the electrical board 75 are disposed within a plane that is orthogonal to the optical axis.

As a result, the zoom motor unit 60 can be disposed in a location that is closer to the lens mount 71 during the collapsed state. Accordingly, the collapsed length of the lens barrel 2 can be reduced, and the size of the lens barrel 2 can be reduced.

The lens barrel 2 according to the present embodiment further includes the aperture unit 66 that is disposed so as to move in the optical axis direction with respect to the outer frame 70. The aperture unit 66 adjusts the amount of light from the subject. The zoom motor 61 and the aperture unit 66 are disposed next to each other in the radial direction. The zoom motor 61 is disposed along with the aperture unit 66 within a plane that is orthogonal to the optical axis AX and is movable in the optical axis direction AX. Furthermore, when viewed from the optical axis AX direction, the deceleration unit 63 and the aperture unit 66 are disposed in locations where those respective units partially overlap.

As a result, the zoom motor 61 and the aperture unit 66 can avoid interfering with each other even if the zoom motor 61 or the aperture unit 66 have moved with respect to the aperture unit 66 or the zoom motor 61 in the optical axis AX direction and are in an overlapping positional relationship when viewed from the direction orthogonal to the optical axis AX. Accordingly, the size of the lens barrel 2 can be further reduced. Furthermore, the deceleration unit 63 can be disposed efficiently in a space that is closer to the lens mount 71 than the aperture unit 66, and that is closer to the inner circumferential side than the outermost contour of the aperture unit 66 and that is on the outer circumferential side of the third lens group G3. Accordingly, the size of the lens barrel 2 can be reduced.

Furthermore, as shown in FIG. 3, in the lens barrel 2 according to the present embodiment, when the lens barrel 2 is not in use, the inner-side straight advance frame 41 is disposed at a first position D1 of a movement region W1 (an example of a movement region) or moves a second position D2. The first position D1 corresponds to an end portion of the movement region W1 on the lens mount 71 side. The movement region W1 is employed when the lens barrel 2 is in use. The second position D2 is closer to the lens mount 71 than the first position D1 of the movement region W1.

Note that the movement region W1 employed when the lens barrel 2 is in use corresponds to a range in which the inner-side straight advance frame 41 moves with respect to the fixed frame 74 in the optical axis direction when the lens barrel 2 is in use, for example, between the telephoto end shooting state and a wide-angle end shooting state. In other words, when the lens barrel 2 is in use, the inner-side straight advance frame 41 moves with respect to the fixed frame 74 in the optical axis direction, in the movement region W1 shown in FIG. 3.

Also, a movement region W2 (a movement range when the lens barrel 2 is not in use) shown in FIG. 3 is a region in which the inner-side straight advance frame 41 moves in case that the lens barrel 2 shifts from an in-use state (or a not-in-use state) to the not-in-use state (or the in-use state). As shown in FIG. 3, the movement region W2 when the lens barrel 2 is not in use corresponds to a region between the first position D1 and the second position D2. Based on this, when the lens barrel 2 is not in use, the inner-side straight advance frame 41 moves from the first position D1 to the second position D2.

Although FIG. 3 shows, as an example, a case where the inner-side straight advance frame 41 moves from the first position D1 to the second position D2 when the lens barrel 2 is not in use, it should be noted that the inner-side straight advance frame 41 may be disposed at the first position D1 when the lens barrel 2 is not in use.

As a result, a greater amount of movement can be ensure for the inner-side straight advance frame 41 and the first lens group G1. Accordingly, the lens barrel 2 can be collapsed when not in use, which makes it possible to reduce the size greatly when carrying the device and so on and increase the usability. Furthermore, this technology can be applied to an optical system in which the first lens group G1 moves extensively toward the subject side at the telephoto end. Accordingly, the zoom ratio of the lens barrel 2 can be increased.

Second Embodiment

Figure 10:
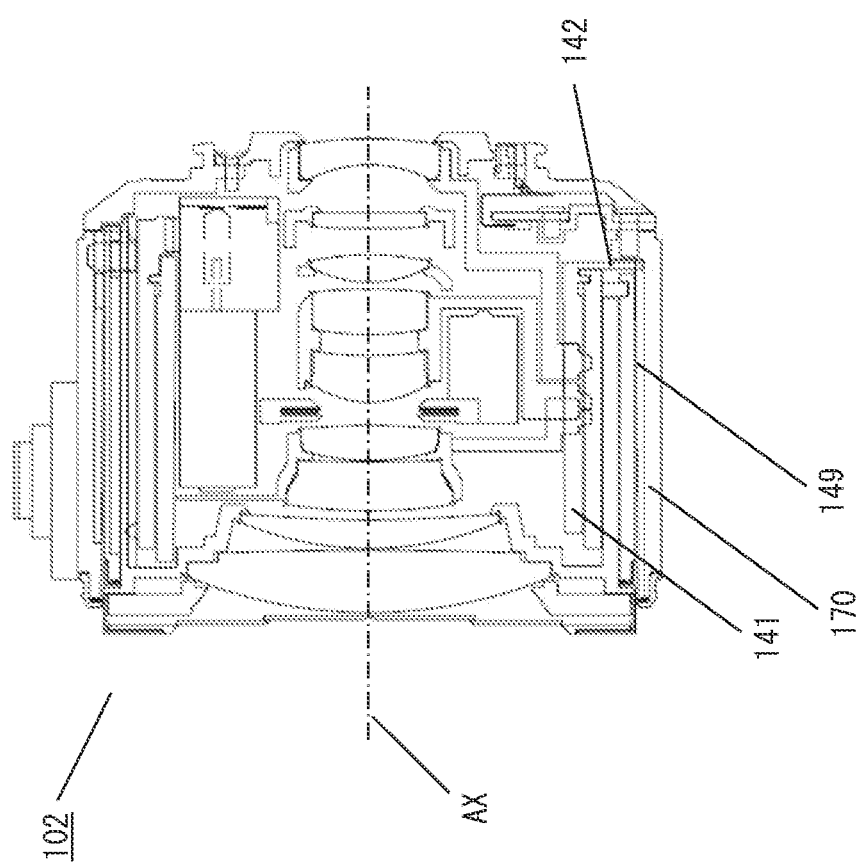
FIG. 10 is a cross-sectional view illustrating a lens barrel in a collapsed state, according to a second embodiment.

FIG. 10 is a cross-sectional view illustrating a lens barrel 102 in a collapsed state, according to a second embodiment. The second embodiment will be described using FIG. 10. Note that configurations having substantially identical functions as configurations described in the aforementioned first embodiment will use the same reference numerals, and detailed descriptions thereof will be omitted.

In the configuration shown in FIG. 10, a second straight advance key 142 of an inner-side straight advance frame 141 engages with a second straight advance guide groove 149 provided on an outer frame 170.

In this manner, the rotation of the inner-side straight advance frame 141 can be restricted from rotating around the optical axis AX by engaging the second straight advance key 142 of the inner-side straight advance frame 141 with a member that does not rotate around the optical axis AX, namely the straight advance guide groove 149 of the outer frame 170. This makes it possible to realize a small-sized lens barrel in the same manner as in the first embodiment.

Third Embodiment

Figure 11:
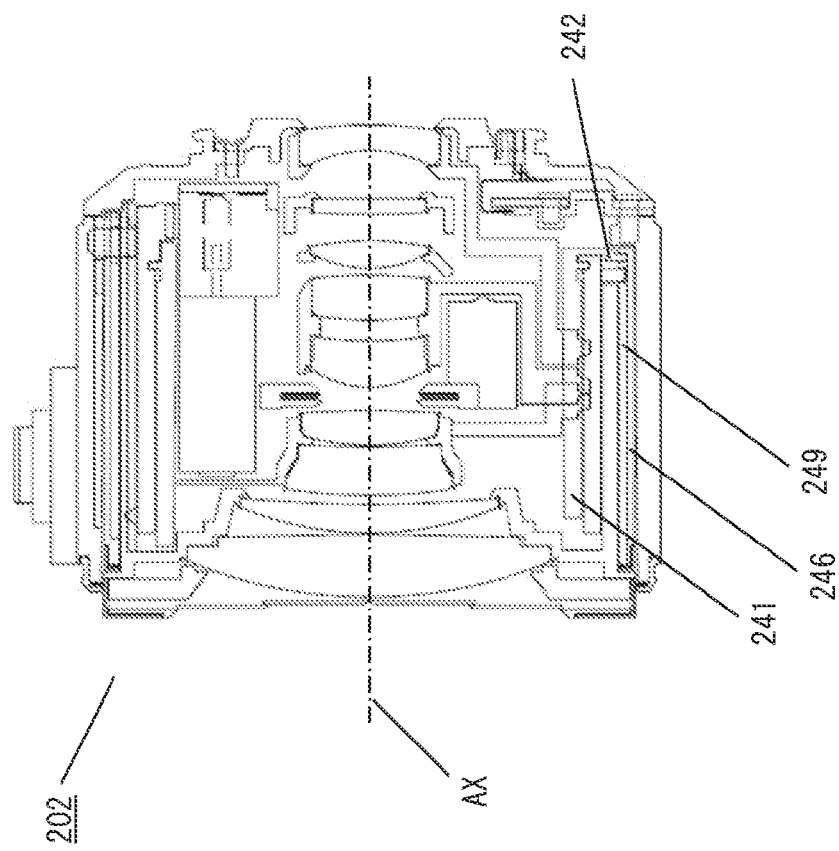
FIG. 11 is a cross-sectional view illustrating a lens barrel in a collapsed state, according to a third embodiment.

FIG. 11 is a cross-sectional view illustrating a lens barrel 202 in a collapsed state, according to a third embodiment. The third embodiment will be described using FIG. 11. Note that configurations having substantially identical functions as configurations described in the aforementioned first embodiment will use the same reference numerals, and detailed descriptions thereof will be omitted.

In the configuration shown in FIG. 11, a second straight advance key 242 of an inner-side straight advance frame 241 engages with a second straight advance guide groove 249 provided in an outer-side straight advance frame 246.

In this manner, as long as the second straight advance key 242 provided in the inner-side straight advance frame 241 engages with a member that does not rotate around the optical axis AX, namely the straight advance guide groove 249 of the outer-side straight advance frame 246, the inner-side straight advance frame 241 can be restricted from rotating around the optical axis AX. This makes it possible to realize a small-sized lens barrel in the same manner as in the first embodiment.

Other Embodiments

The aforementioned first to third embodiments have been described as examples of the technique disclosed in the present application. However, the technique according to the present disclosure is not limited thereto, and can also be applied in embodiments in which the aforementioned details have been changed, replaced, added, or removed as appropriate. The constituent elements described in the aforementioned first to third embodiments can also be combined in order to obtain new embodiments.

Accordingly, a collection of other such embodiments will be described hereinafter.

(1) Although the foregoing embodiments describe the image capturing device 1 as an example of the image capturing device, the image capturing device is not limited to the image capturing device 1. For example, although the image capturing device 1 can capture still images and moving pictures, the image capturing device may be a device that captures only still images, or may be a device that captures only moving pictures.

(2) Although the foregoing embodiments describe the lens barrel 2 as an example of the lens barrel, the lens barrel is not limited to the lens barrel 2. For example, the lens barrel may be a lens barrel used in an integrated-type image capturing device rather than an interchangeable lens barrel.

(3) Although the foregoing embodiments describe the zoom motor 61 as an example, the zoom motor is not limited to a motor. As long as the arrangement in the longitudinal direction and in the direction of the shortest dimension is the same as in the first embodiment, another type of actuator (a piezoelectric actuator, for example) may be employed instead.

(4) Although the fixed frame 74 is attached to the outer frame 70 in the foregoing embodiments, the fixed frame 74 may be attached to the lens mount 71.

(5) Although the cam frame gear 55 is provided on the lens mount 71 side and the second straight advance key 42 is provided on the subject side in the foregoing embodiments, the cam frame gear 55 may be provided on the subject side and the second straight advance key 42 on the lens mount 71 side.

(6) Although the cam frame 50 and the outer frame 70 engage with each other through the first cam pin 56 and a fifth cam groove 73 in the foregoing embodiments, the engagement configuration is not limited thereto. For example, the engagement may be realized through a helicoid or the like.

(7) Although the respective members are restricted from rotating by the straight advance keys and straight advance guide grooves which engages with each other in the foregoing embodiments, the configuration is not limited thereto. Another configuration may be employed as long as the rotational restriction can be realized.

(8) Although the focus lens 29 includes a single lens in the foregoing embodiments, the configuration is not limited thereto. The focus lens 29 may include a plurality of lenses. Alternatively, the focus lens 29 may be omitted.

(9) Although there are three lens groups driven by the cam on the inner circumferential side of the cam frame 50 in the foregoing embodiments, the configuration is not limited thereto. For example, only the second lens retaining frame 15 and the third lens retaining frame 17 may be driven, or four or more lens groups may be driven.

(10) Although zoom operations and focus operations are carried out using the zoom lever 77 and the focus lever 78, respectively, in the foregoing embodiments, the configuration is not limited thereto. Other operation units (a zoom ring, a focus ring, or the like, for example) may be used instead.

(11) Although the aperture unit 66 is attached on the subject side of the third lens group G3 in the foregoing embodiments, the configuration is not limited thereto. The aperture unit 66 may be attached on the lens mount 71 side of the third lens group G3.

(12) Although the foregoing embodiments describe the aperture motor 68 as an example, the aperture motor 68 is not limited to a motor. Another type of actuator (for example, a solenoid actuator) or the like may be used instead.

(13) Although the aperture motor 68 is provided closer to the lens mount 71 than the aperture blades 67 in the foregoing embodiments, the configuration is not limited thereto. The aperture motor 68 may be provided closer to the subject than the aperture blades 67.

(14) Although the respective lens retaining frames include cam pins and the cam frame includes cam grooves in the foregoing embodiments, the configuration is not limited thereto. For example, the lens retaining frames may include the cam grooves and the cam frame may include the cam pins. The bayonet grooves and bayonet keys may be reversed in the same manner.

(15) Although the first lens retaining frame 11 is configured of a single component in the foregoing embodiments, the configuration is not limited thereto. For example, the first lens retaining frame 11 may be configured of two components and divided into a cylindrical portion having the second cam pin 12 and a lens retaining portion that retains the first lens group G1. In this case, these portions are connected to each other.

(16) Although the cam pins, the cam grooves, the straight advance keys, and the straight advance guide grooves are each provided in three locations in the foregoing embodiments, the configuration is not limited thereto. These components may be provided in fewer or more than three locations as long as the functions thereof are realized.

(17) Although an end surface of the cam frame 50 on the lens mount 71 side is flat in the foregoing embodiments, the configuration is not limited thereto. A region that projects toward the lens mount 71 than the inner-side straight advance frame 41 in the optical axis AX direction may be provided, and if the cam frame gear 55 is provided in that region, a cutout portion or the like may be provided in an area of the end surface aside from the cam frame gear 55.

(18) Although the gear train 64 is configured only of a train of spur gears in the foregoing embodiments, the configuration is not limited thereto. Other gears such as a worm gear or the like may be connected in a part of the train as well.

(19) Although all members in the zoom motor unit 60, with the exception of the output gear 65, are provided on the inner circumferential side of the inner-side straight advance frame 41 in the foregoing embodiments, the configuration is not limited thereto. Part of the inner circumferential side of the inner-side straight advance frame 41 may be made thinner or cut out, part of the zoom motor 61, part of the deceleration unit 63, or the like may enter into the thinner area and the cut out area, and may be disposed in locations that partially overlap with the inner-side straight advance frame 41 in the circumferential direction.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel and the image capturing device. Accordingly, these terms, as utilized to describe the present technology should be interpreted relative to the lens barrel and the image capturing device.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technologies are provided for illustration only, and not for the purpose of limiting the technology as defined by the appended claims and their equivalents.

INDUSTRIAL APPLICABILITY

The lens barrel according to the present disclosure can be made smaller, which is useful in the field of image capturing devices. The present disclosure is applicable specifically in digital still cameras, movie cameras, mobile telephone units having camera functions, smartphones, and the like.

What is claimed is:

1. A lens barrel comprising:
   a fixed frame;
   a rotational frame configured to engage with the fixed frame;
   a first straight advance frame provided on an inner circumferential side of the rotational frame and configured to engage with the rotational frame;
   a first lens retaining frame configured to retain a first lens group and engage with the rotational frame, the first lens group including at least one lens;
   a first drive unit provided on an inner circumferential side of the first straight advance frame and configured to rotationally drive the rotational frame around an optical axis; and
   a second straight advance frame configured to be restricted from rotating by engaging with the fixed frame, engage with the rotational frame, and move in the optical axis direction while maintaining a predetermined distance from the rotational frame in the optical axis direction, wherein:

the first drive unit and the first straight advance frame are configured to move integrally with respect to the fixed frame in an optical axis direction according to a rotation of the rotational frame driven by the first drive unit;

the first lens retaining frame is configured to further move with respect to the first straight advance frame in the optical axis direction, when the first straight advance frame moves with respect to the fixed frame according to the rotation;

the first lens retaining frame is restricted from rotating by engaging with the second straight advance frame; and the first straight advance frame is configured to engage with any one of the first lens retaining frame, the fixed frame, and the second straight advance frame, and is restricted from rotating by any one of the frames.

2. The lens barrel according to claim 1, wherein the first lens retaining frame does not overlap with the fixed frame if the first lens retaining frame moves nearest to the subject side, when viewed from a direction orthogonal to the optical axis.

3. The lens barrel according to claim 1, wherein
the rotational frame includes a gear portion;
the first drive unit includes an actuator and a transmission mechanism; and
the transmission mechanism is configured to engage with the gear portion and transmit an output of the actuator to the rotational frame.

4. The lens barrel according to claim 3, wherein a ridge diameter of the gear portion is equal to or greater than an inner diameter of the first straight advance frame.

5. The lens barrel according to claim 3, wherein a longitudinal direction of the actuator is substantially parallel to the optical axis direction.

6. The lens barrel according to claim 3, wherein the direction of the shortest dimension of the actuator follows a normal direction of the first straight advance frame.

7. The lens barrel according to claim 3, wherein
one end of the rotational frame in the optical axis direction includes a protruding portion;
the protruding portion is configured to extend beyond an end portion of the first straight advance frame in the optical axis direction on the basis of the end portion of the first straight advance frame; and
the gear portion is provided on the protruding portion.

8. The lens barrel according to claim 7, wherein the protruding portion is provided on the end of the rotational frame which is on the opposite side of the subject in the optical axis direction.

9. The lens barrel according to claim 1, wherein
the rotational frame includes a gear portion; and
the first straight advance frame is restricted from rotating by engaging with the first lens retaining frame at an end portion that is on farther side from the gear portion of the rotational frame.

10. The lens barrel according to claim 1, wherein
the first lens retaining frame is provided on an outer circumferential side of the rotational frame and includes one of at least one first cam pin and at least one first cam groove on an inner circumferential side;
the rotational frame includes the other of at least one first cam pin and at least one first cam groove on an outer circumferential side;
the first cam pin and the first cam groove engage with each other; and the second straight advance frame is provided on an outer circumferential side of the first lens retaining frame.

11. The lens barrel according to claim 1, further comprising:
a second lens retaining frame disposed on an inner circumferential side of the first straight advance frame and including a second cam pin, the second cam pin configured to pass through the first straight advance frame from the inner circumferential side of the first straight advance frame to an outer circumferential side of the first straight advance frame and engage with the rotational frame, wherein
the rotational frame includes a second cam groove, the second cam groove configured to engage with the second cam pin on the inner circumferential side of the rotational frame; and
the second lens retaining frame is restricted from rotating by engaging with the first straight advance frame and is driven in the optical axis direction by rotation of the rotational frame.

12. The lens barrel according to claim 11, wherein
the second lens retaining frame retains a second lens group including at least one lens; and
the second lens group is provided on farther side from the subject than the first lens group.

13. The lens barrel according to claim 11, further comprising:
a third lens retaining frame disposed on the inner circumferential side of the first straight advance frame and including a third cam pin, the third cam pin configured to pass through the first straight advance frame from the inner circumferential side of the first straight advance frame to an outer circumferential side of the first straight advance frame and engage with the rotational frame, wherein
the rotational frame includes a third cam groove, the third cam groove configured to engage with the third cam pin on the inner circumferential side of the rotational frame;
the third lens retaining frame is restricted from rotating by engaging with the first straight advance frame and is driven in the optical axis direction by rotation of the rotational frame; and
the actuator is disposed between the second cam pin and the third cam pin when viewed from the optical axis direction.

14. The lens barrel according to claim 13, wherein
the first drive unit includes a transmission mechanism, the transmission mechanism configured to transmit an output of the actuator to the rotational frame; and
at least one of the second cam pin and the third cam pin is configured to overlap with the transmission mechanism when viewed from the optical axis direction.

15. The lens barrel according to claim 13, further comprising:
a fourth lens retaining frame supported by the second lens retaining frame and configured to move with respect to the second lens retaining frame in the optical axis direction; and
a second drive unit configured to drive the fourth lens retaining frame in the optical axis direction, wherein
the second drive unit is disposed between the second cam pin and the third cam pin when viewed from the optical axis direction.

16. The lens barrel according to claim 13, wherein at least one of the second cam pin and the third cam pin is disposed between the first drive unit and the second drive unit.

17. The lens barrel according to claim 1, further comprising:
- an electrical board configured to supply electrical power to the first drive unit, wherein
- the electrical board is attached to the fixed frame; and
- the first drive unit and the electrical board are disposed within a plane that is orthogonal to the optical axis, when the first straight advance frame is closest to the electrical board.

18. The lens barrel according to claim 1, further comprising:
- an aperture unit disposed so as to move in the optical axis direction with respect to the fixed frame, and configured to adjust an amount of light from the subject that enters the lens barrel, wherein
- the first drive unit includes an actuator; and
- the actuator is configured to move in the optical axis direction, and the actuator and the aperture unit are disposed within a plane that is orthogonal to the optical axis.

19. The lens barrel according to claim 1, wherein
the first straight advance frame is configured to move to a first position or a second position when the lens barrel is unused, the first position corresponding to a first end portion of a movement region on the farther side from the subject, the second position which is farther from the subject than the first end portion, the moving region corresponding to a region in which straight advance frame moves with respect to the fixed frame in the optical axis direction.

20. The lens barrel according to claim 1, wherein the first drive unit, the first straight advance frame, and the rotational frame are arranged in this order from inside of the lens barrel to outside of the lens barrel.

* * * * *